2,867,535

PROCESS FOR DRYING NON-CRYSTALLIZABLE SUGAR MOLASSES

Moises Salcedo Vega, Colonia del Valle, Mexico, assignor to Sucro-Mel Sociedad Anonima, Mexico City, Mexico, a corporation of Mexico No Drawing. Application January 4, 1957
Serial No. 632,425

3 Claims. (Cl. 99—6)

The present invention relates to an improved process for drying non-crystallizable sugar molasses to produce a non-hygroscopic solid product.

It is known that natural liquid products, especially foodstuffs such as milk, fruit juices and the like, can be converted into a solid form by adding carriers to the liquid and then evaporating to dryness. The carriers employed serve to hold the aromatic substances, to improve the solubility of the dry end product and also to prevent caking of the end product.

Aqueous extracts of solid foodstuffs, such as coffee and tea, have also been dried to produce completely soluble powders in the same manner. Carriers which have been employed for such drying processes to hold the aromatic substances, and to avoid caking and hygroscopicity, for example, are as follows: gelatine, agar-agar, pectin, soluble and insoluble carbohydrates and also inorganic materials such as silica.

In the production of sugar from sugar cane or sugar beets, sugar juices and molasses are produced as by-products whose sugar concentration is relatively high but which also contain impurities which substantially reduce the capability of crystallization of such sugar containing solutions. A number of procedures are known for the removal of such crystallization inhibitors which depend upon precipitation, adsorption, ion-exchange and the like. However, such procedures are often very expensive. On the other hand, the consistency of raw juices or molasses which mostly are liquid or pasty renders them unsuitable for commerce even though they are suited as a foodstuff, or at least as animal feeds, in view of their carbohydrate and protein content.

This is also true of the amorphous sugar, known in Latin American countries as "piloncillo," obtained simply from prepurified and concentrated cane sugar juice.

The conversion of such viscous liquid products into a suitable solid form previously was not successful, as the dried products were very hygroscopic and therefore absorbed so much water in a short period that they caked upon standing a short time and after long standing tended to liquify slowly. The previously suggested stabilizing additives did not solve this problem, as they were either fundamentally unsuited or too expensive or they could not be used as additives for foods or feeds.

According to the invention it was unexpectedly found that the difficultly crystallizable molasses obtained in the production of sugar from sugar cane or sugar beets could be converted to solid, non-hygroscopic dry products by mixing sodium stearate, calcium oxide, alcohol and water with the crude molasses and then drying the resulting mixture by conventional procedures, preferably by spray drying. For example, the stabilizing additive according to the invention can contain 8 to 12% of sodium stearate, 45 to 55% of calcium oxide, 4 to 6% of ethyl alcohol and 25 to 35% water and expediently about 11% of sodium stearate, 52% of calcium oxide, 5% of ethyl alcohol and 32% of water, the percentages being given by weight.

The preferred quantity of such additive employed according to the invention is 20 to 25 grams per unit of molasses having a dry solids content corresponding to about that of 1000 grams of molasses of a specific gravity of 85° Brix at 20° C. Consequently, if the molasses is more concentrated, the quantity of the stabilizing additive should be increased proportionately and, conversely, if the molasses is less concentrated the quantity thereof should be decreased proportionately.

If the consistency of the molasses-additive mixture is too thick for effective spray drying, the consistency can be adjusted by dilution, for example, with water, to reduce the consistency to that desired, for example, to that corresponding to a specific gravity of about 75° Brix.

The following example will illustrate the manner of producing the stabilizing additive according to the invention and the production of a dry stable non-hygroscopic product from molasses with its aid.

Example

The stabilizing additive was prepared from

|  | G. |
|---|---|
| Sodium stearate | 1000 |
| Calcium oxide | 5000 |
| Ethyl alcohol | 500 |
| Water | 3000 | by slowly adding the solids to the water with constant stirring and then adding the alcohol.

The prepared stabilizing additive mixture was then added to a molasses of 85° Brix at 20° C. and thoroughly mixed therewith to effect uniform distribution in the molasses. 20 to 25 g., preferably 23.5 g. of the stabilizing additive were employed per kilogram of molasses to be dried.

The mixture thus obtained was then diluted with water to a specific gravity most suited for the spray drying process employed, namely, about 75° Brix, and then rapidly preheated to a temperature of about 80° C. in a continuous heater and then introduced into the spray drier where it was atomized and flash evaporated with an inert gaseous drying medium, preferably dehumidified, such as air heated to a temperature of 150 to 200° C., preferably 170 to 180° C.

A loose powdered product was obtained which was insensitive to atmospheric moisture and can be stored for longer periods of time and transported in the usual water tight packings.

The process can be employed for the production of satisfactory non-hygroscopic dry products from all molasses occurring in the production of sugar, for example, the end molasses of sugar factories or refineries, which can contain 35 to 73% of sugar and have specific gravities of 75° to 95° Brix at 20° C., or the crude molasses (piloncillo) which have been preconcentrated to specific gravities of 55 to 75° Brix and, if desired, prepurified or the invert molasses obtained in the production of invert sugar from sucrose which have specific gravities of 60° to 93° Brix. The term molasses as employed in the claims is therefore intended to cover all such molasses.

I claim:

1. A process for the production of non-hygroscopic dry products from molasses which comprises thoroughly mixing a mixture of 8 to 12% sodium stearate, 45 to 55% calcium oxide, 4 to 6% ethyl alcohol and 25 to 35% water with molasses, the quantity of such mixture admixed with the molasses being about 20 to 25 g. per unit of molasses having a dry solids content corresponding about to that of 1000 grams of molasses of a specific gravity of 85° Brix at 20° C., and then spray drying such admixture.

2. A process for the production of non-hygroscopic dry products from molasses which comprises thoroughly mixing a mixture of 10 parts by weight of sodium stearate, 50 parts by weight of calcium oxide, 5 parts by weight of ethyl alcohol and 30 parts by weight of water with molasses, the quantity of such mixture admixed with the molasses being about 20 to 25 g. per unit of molasses having a dry solids content corresponding about to that of 1000 grams of molasses of a specific gravity of 85° Brix at 20° C., and then spray drying such admixture.

3. A powdered non-hygroscopic dry molasses product produced by the process of claim 1.

References Cited in the file of this patent

UNITED STATES PATENTS

| | | |
|---|---|---|
| 1,897,729 | MacLachlan | Feb. 14, 1933 |
| 2,053,871 | Leonard | Sept. 8, 1936 |

FOREIGN PATENTS

| | | |
|---|---|---|
| 139,280 | Australia | May 5, 1949 |